(12) United States Patent
England et al.

(10) Patent No.: US 7,601,450 B2
(45) Date of Patent: Oct. 13, 2009

(54) HYBRID INTERCONNECT FOR A SOLID-OXIDE FUEL CELL STACK

(75) Inventors: Diane M. England, Bloomfield, NY (US); Lane Wilson, Bruceton Mills, WV (US); Subhasish Mukerjee, Rochester, NY (US); Catherine Vavonese, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 550 days.

(21) Appl. No.: 11/087,904

(22) Filed: Mar. 23, 2005

(65) Prior Publication Data

US 2006/0216567 A1   Sep. 28, 2006

(51) Int. Cl.
*H01M 2/02* (2006.01)

(52) U.S. Cl. .................. 429/34; 429/35; 429/36

(58) Field of Classification Search .......... 429/34, 429/35, 36; 428/131
See application file for complete search history.

(56) References Cited

U.S. PATENT DOCUMENTS

| | | | | |
|---|---|---|---|---|
| 3,489,614 | A | * | 1/1970 | Tomter ........................ 429/38 |
| 3,530,003 | A | * | 9/1970 | Verger et al. .................. 429/39 |
| 6,207,310 | B1 | * | 3/2001 | Wilson et al. ................. 429/26 |
| 2003/0091887 | A1 | * | 5/2003 | Ihonen et al. ................. 429/38 |
| 2004/0101742 | A1 | * | 5/2004 | Simpkins et al. .............. 429/44 |
| 2004/0247978 | A1 | * | 12/2004 | Shimamune ................. 429/34 |

* cited by examiner

*Primary Examiner*—Raymond Alejandro
(74) *Attorney, Agent, or Firm*—Paul L. Marshall

(57) ABSTRACT

An electrical interconnect for a fuel cell assembly comprising a peripheral frame formed of one or more materials having a coefficient of thermal expansion similar to that of adjacent elements to which the interconnect must be bonded and a central portion formed of a corrosion-resistant material for conducting electric current between adjacent fuel cells. Preferably, the central portion is attached to the peripheral frame via a brazed corrugated lap joint for relieving thermal expansion differences between the frame and the central portion. Preferably, the joint includes an interlayer of a ductile material, for example, a nickel, copper, silver or gold layer, which helps to relieve thermal stress between the frame and the central portion.

23 Claims, 2 Drawing Sheets

HYBRID INTERCONNECT FOR A SOLID-OXIDE FUEL CELL STACK

This invention was made with United States Government support under Government Contract/Purchase Order No. DE-FC26-02NT41246 awarded by DOE. The Government has certain rights in this invention.

TECHNICAL FIELD

The present invention relates to fuel cells; more particularly, to solid-oxide fuel cells; and most particularly, to an improved electrical interconnect for a fuel cell, the interconnect comprising a frame formed of a first alloy having a coefficient of thermal expansion (CTE) matching the CTE of adjacent fuel cell elements to which the frame is bonded, and an electrically-conductive insert formed of a second alloy resistant to fuel- or air-induced corrosion.

BACKGROUND OF THE INVENTION

Fuel cells for combining hydrogen and oxygen to produce electricity are well known. A known class of fuel cells includes a solid-oxide electrolyte layer through which oxygen anions migrate; such fuel cells are referred to in the art as "solid-oxide" fuel cells (SOFCs).

In some applications, for example, as an auxiliary power unit (APU) for a transportation application, an SOFC is preferably fueled by "reformate" gas, which is the effluent from a catalytic liquid or gaseous hydrocarbon oxidizing reformer. Reformate typically includes amounts of carbon monoxide (CO) as fuel in addition to molecular hydrogen. The reforming operation and the fuel cell operation may be considered as first and second oxidative steps of the hydrocarbon fuel, resulting ultimately in water and carbon dioxide. Both reactions are preferably carried out at relatively high temperatures, for example, in the range of 700° C. to 1000° C.

A complete fuel cell stack assembly includes fuel cell subassemblies and a plurality of components known in the art as interconnects, which electrically connect the individual fuel cell subassemblies, in series. It is desirable that the chemical resistance of the interconnects be high, and accordingly some nickel-based metal alloys could be useful in this regard. However, it is also very desirable that the CTE of each interconnect matches the CTE of adjacent elements to which the interconnect is bonded during assembly, so that leaks will not develop when the assembly is heated to its operating temperatures. In general, the desirable corrosion-resistant alloys are not good CTE matches for sealing into a fuel cell stack, which has resulted in the use of ferritic stainless steels. However, ferritic stainless steels oxidize relatively rapidly at temperatures above 650° C.

What is needed is an interconnect that enjoys both the chemical resistance of nickel-based alloys and the thermal dimensional performance of ferritic stainless steels.

It is a principal object of the present invention to provide an interconnect periphery having a CTE approximating that of adjacent elements in a solid-oxide fuel cell stack.

It is a further object of the invention to provide long working lifetime of an interconnect in a solid-oxide fuel cell stack.

SUMMARY OF THE INVENTION

Briefly described, a fuel cell electrical interconnect in accordance with the invention comprises a peripheral frame, formed of one or more materials having a CTE similar to that of adjacent elements to which the interconnect must be bonded, and a central portion formed of a corrosion-resistant material for conducting electric current between adjacent fuel cells. The central portion is attached to the peripheral frame via a wide gap brazed, brazed joint, or welded joint, for relieving thermal expansion differences between the frame and the central portion. Preferably, the joint includes a braze layer which may or may not include a ductile interlayer, for example, a nickel, copper, gold or silver layer, which helps to relieve thermal stress between the frame and the central portion of the interconnect and aids in the ability of the joint to withstand multiple thermal cycles. A conductive path is formed between the anode and associated central portion of the interconnect by a metal mesh that freely passes oxygen, such as a silver mesh, and between the cathode and associated central portion formed of materials such as a nickel based superalloy, such as Haynes 230, or a silver mesh.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
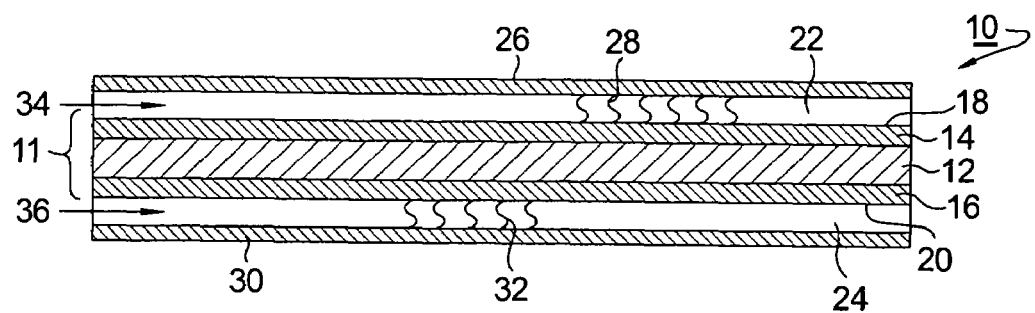
FIG. 1 is a schematic elevational cross-sectional view of a portion of a solid-oxide fuel cell assembly in accordance with the invention.
Figure 2:
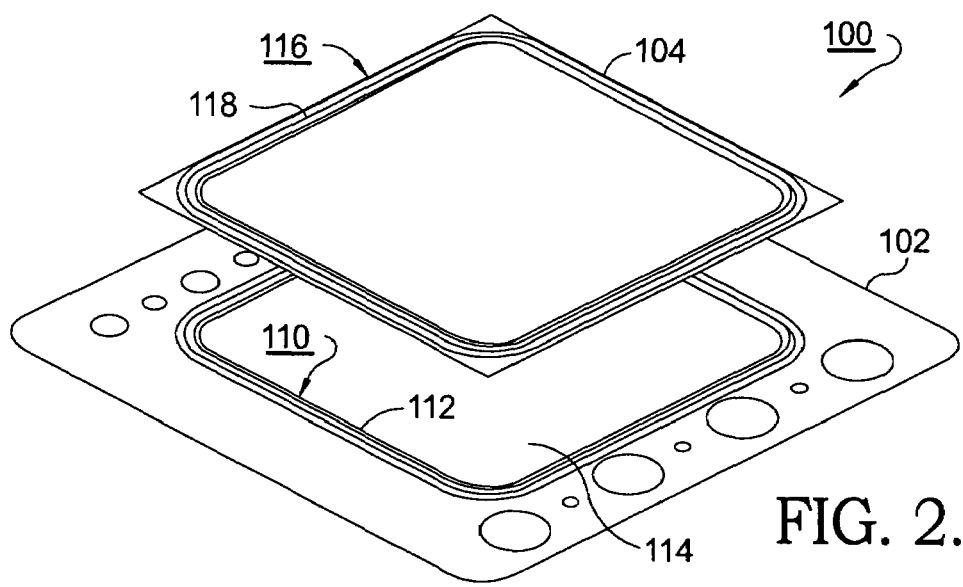
FIG. 2 is an exploded isometric view of a fuel cell interconnect in accordance with the invention.

Referring to FIG. 1, a portion of a fuel cell subassembly 10 includes structural and electrochemical elements known in the art of solid-oxide fuel cells. The example shown is of a class of such fuel cells said to be "anode-supported" in that the anode is a structural element having the electrolyte and cathode deposited upon it. Thus, element thicknesses as shown in FIGS. 1 and 2 are not to scale. A complete fuel cell stack assembly includes fuel cell subassemblies electrically connected, in series.

In the portion of fuel cell subassembly 10 shown in FIG. 1, each fuel cell subassembly includes an electrode 11 having an electrolyte element 12 separating an anodic element (anode) 14 and a cathodic element (cathode) 16. The electrolyte element preferably is formed of a ceramic oxide and preferably includes zirconia stabilized with yttrium oxide (yttria), known in the art as YSZ. The cathode is formed of, for example, porous lanthanum strontium manganate or lanthanum strontium iron, and the anode is formed of, for example, a mixture of nickel and YSZ. Each anode and cathode is in direct chemical contact with its respective surface of the electrolyte, and each anode and cathode has a respective free surface 18,20 forming one wall of a respective passageway 22,24 for flow of gas 34, 36 across the surface.

Anode 14 faces and is electrically connected to a metal interconnect 26 by filaments 28 extending across but not blocking the passageway 22. Similarly, cathode 16 faces and is electrically connected to a metal interconnect 30 by filaments 32 extending across but not blocking the passageway 24. Electrical connections alternative to filaments 32 may be bumps or corrugations formed in the interconnects (not shown) or porous conductive materials such as metal wool or metal weavings disposed (not shown) in the passageways 22,24 as are known in the prior art.

Interconnects 26,30 are formed typically of a single piece of metal material, for example, ferritic stainless steel. As noted above, ferritic materials, while thermally compatible with other fuel cell elements to which they are bonded, offer inferior corrosion resistance in wet hydrogen atmospheres. It is further known that nickel-based superalloys, for example, Haynes 230 alloy and Inconel 718, offer superior corrosion resistance but are thermally incompatible due to CTE differences with the other fuel cell elements.

Figure 3:
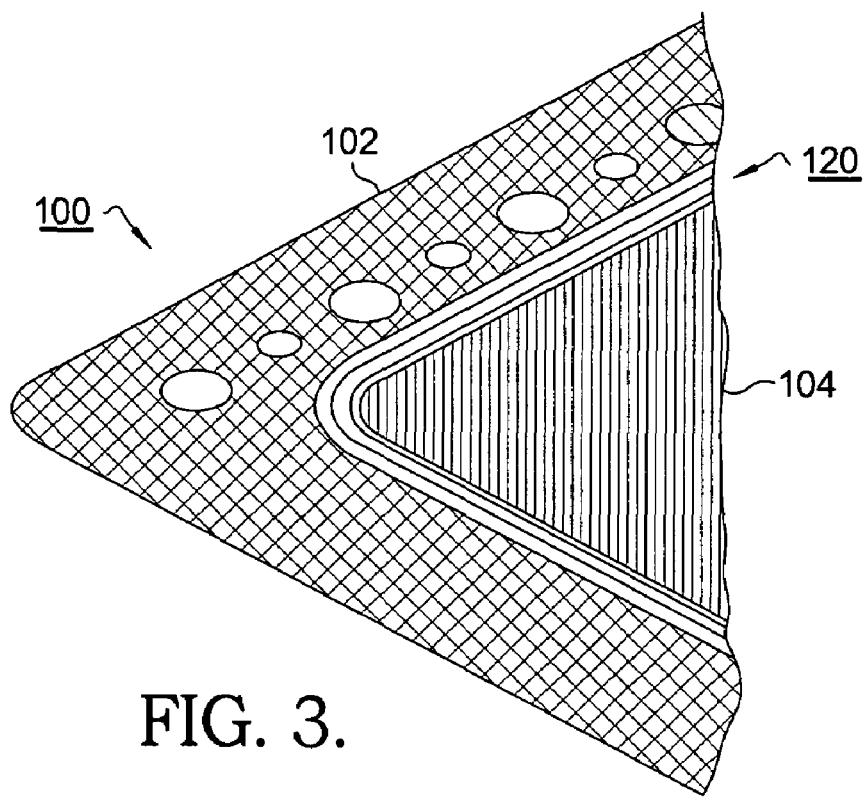
FIG. 3 is a detailed isometric view of a corner portion of the interconnect shown in FIG. 2.
Figure 4:
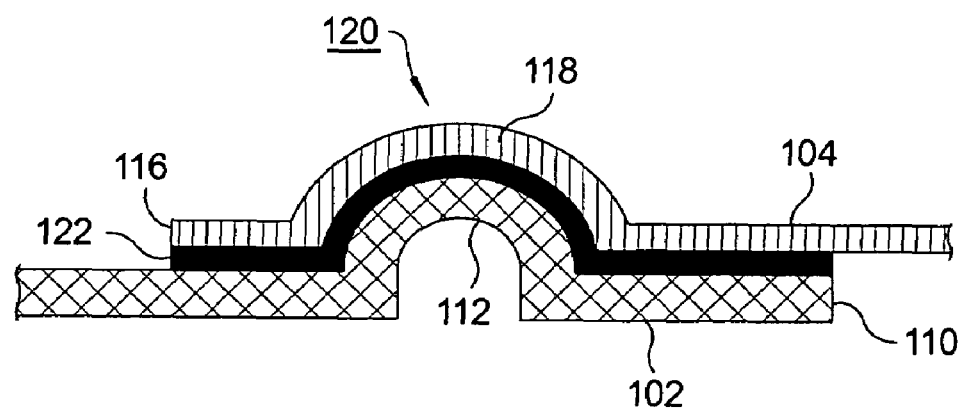
FIG. 4 is a cross-section taken through the corrugated joint between the peripheral frame and the central portion of the interconnect shown in FIG. 2.

Referring to FIGS. 2 through 4, in accordance with the invention, each of prior art interconnects 26,30 in FIG. 1 is replaced by an interconnect hybrid structure 100 comprising a peripheral frame 102, formed of one or more materials having a CTE substantially equal to the CTE of adjacent elements to which the interconnect must be bonded, and a central portion 104, formed of a corrosion-resistant material for conducting electric current between adjacent fuel cells in a fuel cell stack.

The only place in a fuel cell stack where the CTEs of fuel cell elements must match is on the periphery of the stack. The interconnect is attached to adjacent elements via a bonded seal (not shown) comprising, for example, a glass or a fluorophlogopite mica. In either case, the seal material protects peripheral frame 102 from severe oxidation and volitilization of chromium. Therefore, frame 102 may be formed of, for example, ferritic stainless steels or low expansion alloys such as FECRALLOY®, available in sheet form as FE083200 FECRALLOY®—Iron/Chromium (Fe72.8/Cr22/Al 5/Y 0.1/Zr 0.1) from Goodfellow Corporation, Devon, Pa., USA; or Crofer 22 APU, available from ThyssenKrupp AG, Duesseldorf, Germany.

The central portion 104 is formed of a nickel-based superalloy, for example, HAYNES® 230® alloy, UNS No. N06230, comprising 57Ni-22Cr-14W-2Mo-0.5Mn-0.4Si-0.3Al-0.10C-0.02La-5Co-3Fe-0.015B, available from Haynes International, Inc., Kokomo, Ind., USA; or INCONEL® 718 alloy, available from High Temp Metals, Inc., Sylmar, Calif., USA. Other proprietary superalloys may also be suitable.

A conductive path between anode 14 of electrode 11 and its associated central portion 104 of structure 100 is formed of a metal mesh material that freely passes oxygen, such as for example a silver mesh, disposed between the electrode and central portion (Shown as 32 in FIG. 1). A conductive path between cathode 16 and its associated central portion 104 is formed of a conductive metal mesh, such as for example, a superalloy or silver mesh.

Still referring to FIGS. 2 through 4, the inner edge 110 of frame 102 is preferably formed as by stamping into a first continuous corrugate rib 112 extending around opening 114 which corrugation may be either male or female. Similarly, the outer edge 116 of central portion 104 is formed as by stamping into a second continuous corrugate rib 118 having substantially the same dimensions as first rib 112 such that the ribs when overlain mate as shown in FIG. 4 may be joined in known fashion along the longitudinal extent of the ribs as by brazing or wide gap brazing to form a lap joint 120. It is also contemplated that frame 102 and central portion 104 may be formed without respective corrugated ribs and be joined together by brazing, wide gap brazing, or welding as, for example, by diffusion welding, or laser welding to form a lap joint.

Obviously, ribs 112,118 may be formed such that, when assembled, rib 118 is female and rib 112 is male, or vice versa. Preferably, a thin layer 122 of a ductile material, such as for example, a ductile metal such as nickel, copper, silver or gold, or combinations thereof, is inserted between ribs 112,118 prior to brazing or welding, which can help to relieve stress imbalances between frame 102 and central portion 104 in use in a fuel cell due to the ductility of the thin layer.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. In a fuel cell having fuel cell sub-assemblies for reacting oxygen and fuel to produce electricity, said fuel cell sub-assemblies including an electrode, an electrical interconnect coupled to at least one adjacent element, said interconnect comprising:
   a) a peripheral frame having a central opening, said peripheral frame formed of a first material having a coefficient of thermal expansion substantially equal to that of said at least one adjacent element; and
   b) a central portion disposed in said central opening adjacent to said electrode as a whole and attached to said peripheral frame, said central portion formed of a second material that is resistant to corrosion, wherein said second material is a nickel-based superalloy, wherein said central portion is not said at least one adjacent element, and wherein said electrical interconnect is electrically conductive and configured to electrically connect said fuel cell sub-assemblies and seal against leakage of said oxygen and said fuel.

2. A fuel cell in accordance with claim 1 wherein said interconnect is bonded to said electrode.

3. A fuel cell in accordance with claim 1 wherein said peripheral frame is formed of a material selected from the group consisting of ferritic stainless steel, a low expansion alloy, and combinations thereof.

4. A fuel cell in accordance with claim 1 wherein said central portion and said peripheral frame are joined by a lap joint therebetween.

5. A fuel cell in accordance with claim 4 wherein said lap joint comprises a first rib on said peripheral frame and a second rib on said central portion matable with said first rib.

6. A fuel cell in accordance with claim 5 wherein said lap joint includes a layer of a ductile material disposed between said first rib and said second rib.

7. A fuel cell in accordance with claim 6 wherein said ductile material is a metal.

8. A fuel cell in accordance with claim 7 wherein said ductile metal is selected from the group consisting of nickel, copper, silver or gold, and combinations thereof.

9. A fuel cell in accordance with claim 1 further comprising a conductive path between said electrode and said central portion.

10. A fuel cell in accordance with claim 9 wherein said conductive path is formed of a metal mesh material.

11. A fuel cell in accordance with claim 1 wherein said first material is different than said second material.

12. A fuel cell assembly including a plurality of fuel cell sub-assemblies for reacting oxygen and fuel to produce electricity, each of said plurality of fuel cell sub-assemblies comprising an electrode and at least one electrical interconnect, wherein said interconnect includes a peripheral frame having a central opening and a periphery, said interconnect being coupled to adjacent elements at said periphery, said peripheral frame formed of a first material having a coefficient of thermal expansion substantially equal to that of said adjacent elements, and said interconnect further including a central portion disposed in said central opening adjacent to said electrode as a whole and attached to said peripheral frame, said central portion formed of a second material that is resistant to corrosion at temperatures and chemical conditions pertaining within said fuel cell assembly, wherein said second material is a nickel-based superalloy, wherein said central portion is not said adjacent elements, and wherein said at least one electrical interconnect is electrically conductive and configured to electrically connect said fuel cell sub-assemblies and seal against leakage of said oxygen and said fuel.

13. A fuel cell assembly in accordance with claim 12 further comprising a conductive path between said electrode and said central portion.

14. A fuel cell assembly in accordance with claim 13, wherein said conductive path is formed of a metal mesh material.

15. A fuel cell assembly in accordance with claim 12 wherein said first material is different than said second material.

16. In a fuel cell having fuel cell sub-assemblies for reacting oxygen and fuel to produce electricity, said fuel cell sub-assemblies including an electrode, an electrical interconnect coupled to at least one adjacent element, said interconnect comprising:
　a) a peripheral frame having a central opening, said peripheral frame formed of a first material having a first coefficient of thermal expansion substantially equal to that of said at least one adjacent element; and
　b) a central portion disposed in said central opening adjacent to said electrode as a whole and attached to said peripheral frame, said central portion formed of a second material having a second coefficient of thermal expansion that is different than said first coefficient of thermal expansion, wherein said second material is resistant to corrosion, wherein said central portion is not said at least one adjacent element, wherein said electrical interconnect is electrically conductive and configured to electrically connect said fuel cell sub-assemblies and seal against leakage of said oxygen and said fuel.

17. A fuel cell in accordance with claim 16 wherein said first material selected from the group consisting of ferritic stainless steel, a low expansion alloy, and combinations thereof.

18. A fuel cell in accordance with claim 17 wherein said second material is a nickel-based superalloy.

19. A fuel cell in accordance with claim 16 wherein said first material is different than said second material.

20. A fuel cell in accordance with claim 16 wherein said at least one adjacent element is directly connected to said peripheral frame.

21. A fuel cell in accordance with claim 16 wherein said electrical interconnect is not an ion exchange membrane.

22. A fuel cell in accordance with claim 16 wherein said electrical interconnect is an impermeable barrier that defines an outer wall, wherein said outer wall and said electrode form a passageway for one of said oxygen and said fuel.

23. In a fuel cell including an electrode, an electrical interconnect coupled to at least one adjacent element, said interconnect comprising:
　a) a peripheral frame having a central opening, said peripheral frame formed of a first material having a coefficient of thermal expansion substantially equal to that of said at least one adjacent element; and
　b) a central portion disposed in said central opening adjacent to said electrode as a whole and attached to said peripheral frame, said central portion formed of a second material that is resistant to corrosion, wherein said second material is a nickel-based superalloy, wherein said central portion is not said at least one adjacent element, wherein said central portion and said peripheral frame are joined by a lap joint therebetween, wherein said lap joint comprises a first rib on said peripheral frame and a second rib on said central portion matable with said first rib, and wherein said lap joint includes a layer of a ductile material disposed between said first rib and said second rib.

* * * * *